(12) United States Patent
Tuttle

(10) Patent No.: US 11,238,248 B2
(45) Date of Patent: *Feb. 1, 2022

(54) SYSTEMS AND METHODS USING SINGLE ANTENNA FOR MULTIPLE RESONANT FREQUENCY RANGES

(71) Applicant: Micron Technology, Inc., Boise, ID (US)

(72) Inventor: John R. Tuttle, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/940,240

(22) Filed: Jul. 27, 2020

(65) Prior Publication Data
US 2020/0356738 A1    Nov. 12, 2020

Related U.S. Application Data

(63) Continuation of application No. 16/297,526, filed on Mar. 8, 2019, now Pat. No. 10,726,217, which is a continuation of application No. 15/250,632, filed on Aug. 29, 2016, now Pat. No. 10,242,239, which is a continuation of application No. 14/710,498, filed on May 12, 2015, now Pat. No. 9,465,964, which is a continuation of application No. 14/183,240, filed on Feb. 18, 2014, now Pat. No. 9,047,523, which is a continuation of application No. 12/123,826, filed on May 20, 2008, now Pat. No. 8,712,334.

(51) Int. Cl.
*G06K 7/10* (2006.01)
*H04Q 9/00* (2006.01)

(52) U.S. Cl.
CPC ..... *G06K 7/10346* (2013.01); *G06K 7/10227* (2013.01); *G06K 7/10316* (2013.01); *H04Q 9/00* (2013.01); *H04Q 2209/47* (2013.01); *H04Q 2209/75* (2013.01)

(58) Field of Classification Search
CPC ... G06K 7/10316; G06K 7/10227; H04Q 9/00
See application file for complete search history.

(56) References Cited

U.S. PATENT DOCUMENTS

| 3,569,976 | A | 3/1971 | Korvin et al. |
| 3,733,608 | A | 5/1973 | McGhay et al. |
| 3,745,568 | A | 7/1973 | Schindler et al. |
| 3,745,569 | A | 7/1973 | Works et al. |
| 4,075,632 | A | 2/1978 | Baldwin et al. |
| 4,173,019 | A | 10/1979 | Williams |

(Continued)

OTHER PUBLICATIONS

Chartered Semiconductor Manufacturing, "Toppan Announces Volume Production of Next Generation RFID Chip," press release, Jul. 8, 2003.

(Continued)

*Primary Examiner* — Md K Talukder
(74) *Attorney, Agent, or Firm* — Greenberg Traurig

(57) ABSTRACT

A radio frequency device utilizing an antenna having a single antenna structure resonant on multiple resonant frequency ranges. The antenna can be configured to operate within multiple frequency ranges for communication according to respective protocols associated with the respective frequency ranges.

16 Claims, 8 Drawing Sheets

(56) References Cited

U.S. PATENT DOCUMENTS

| | | |
|---|---|---|
| 4,623,874 A | 11/1986 | Thoma |
| 4,630,044 A | 12/1986 | Polzer |
| 4,692,769 A | 9/1987 | Gegan |
| 4,926,182 A | 5/1990 | Ohta et al. |
| 4,963,887 A | 10/1990 | Kawashima et al. |
| 5,023,866 A | 6/1991 | De Muro |
| 5,053,774 A | 10/1991 | Schuermann et al. |
| 5,081,458 A | 1/1992 | Meunier |
| 5,084,699 A | 1/1992 | DeMichele |
| 5,119,099 A | 6/1992 | Haruyama et al. |
| 5,164,985 A | 11/1992 | Nysen et al. |
| 5,182,570 A | 1/1993 | Nysen et al. |
| 5,320,561 A | 6/1994 | Cook et al. |
| 5,374,930 A | 12/1994 | Schuermann |
| 5,446,447 A | 8/1995 | Carney et al. |
| 5,448,110 A | 9/1995 | Tuttle et al. |
| 5,450,086 A | 9/1995 | Kaiser |
| 5,465,099 A | 11/1995 | Mitsui et al. |
| 5,467,099 A | 11/1995 | Bonebright et al. |
| 5,491,484 A | 2/1996 | Schuermann |
| 5,491,715 A | 2/1996 | Flaxl |
| 5,512,910 A | 4/1996 | Murakami et al. |
| 5,528,222 A | 6/1996 | Moskowitz et al. |
| 5,537,105 A | 7/1996 | Marsh et al. |
| 5,561,435 A | 10/1996 | Nalbandian et al. |
| 5,572,226 A | 11/1996 | Tuttle |
| 5,598,169 A | 1/1997 | Drabeck et al. |
| 5,606,323 A | 2/1997 | Heinrich et al. |
| 5,617,060 A | 4/1997 | Wilson et al. |
| 5,621,412 A | 4/1997 | Sharpe et al. |
| 5,649,295 A | 7/1997 | Shober et al. |
| 5,649,296 A | 7/1997 | MacLellan et al. |
| 5,682,143 A | 10/1997 | Brady et al. |
| 5,726,630 A | 3/1998 | Marsh et al. |
| 5,771,021 A | 6/1998 | Veghte et al. |
| 5,838,235 A | 11/1998 | Thorigne |
| 5,842,118 A | 11/1998 | Wood, Jr. |
| 5,889,478 A | 3/1999 | Minesi |
| 5,900,808 A | 5/1999 | Lebo |
| 5,923,298 A | 7/1999 | Miyahara et al. |
| 5,942,977 A | 8/1999 | Palmer et al. |
| 5,959,357 A | 9/1999 | Korman |
| 5,977,928 A | 11/1999 | Ying et al. |
| 6,028,564 A | 2/2000 | Duan et al. |
| 6,037,907 A | 3/2000 | Ha et al. |
| 6,122,494 A | 9/2000 | Tuttle |
| 6,130,602 A | 10/2000 | O'Toole et al. |
| 6,177,872 B1 | 1/2001 | Kodukula et al. |
| 6,184,841 B1 | 2/2001 | Shober et al. |
| 6,192,222 B1 | 2/2001 | Greeff et al. |
| 6,239,765 B1 | 5/2001 | Johnson et al. |
| 6,243,012 B1 | 6/2001 | Shober et al. |
| 6,317,027 B1 | 11/2001 | Watkins |
| 6,329,139 B1 | 12/2001 | Nova et al. |
| 6,329,915 B1 | 12/2001 | Brady et al. |
| 6,356,535 B1 | 3/2002 | Smith |
| 6,362,737 B1 | 3/2002 | Rodgers et al. |
| 6,411,212 B1 | 6/2002 | Hecht et al. |
| 6,574,454 B1 | 6/2003 | Tuttle |
| 6,611,691 B1 | 8/2003 | Zhou et al. |
| 6,717,923 B1 | 4/2004 | Smith |
| 6,738,025 B2 | 5/2004 | Carrender |
| 6,825,773 B1 | 11/2004 | O'Toole et al. |
| 6,885,353 B2 | 4/2005 | Kurihara |
| 7,006,048 B2 | 2/2006 | Chang |
| 7,026,935 B2 | 4/2006 | Diorio et al. |
| 7,075,901 B2 | 7/2006 | Smith |
| 7,091,860 B2 | 8/2006 | Martinez de Velasco Cortina et al. |
| 7,132,946 B2 | 11/2006 | Waldner et al. |
| 7,327,257 B2 | 2/2008 | Posamentier |
| 7,710,273 B2 | 5/2010 | Smith et al. |
| 7,852,221 B2 | 12/2010 | Tuttle |
| 7,924,802 B2 | 4/2011 | Tarighat-Mehrabani et al. |
| 7,953,454 B2 | 5/2011 | Ihara et al. |
| 8,174,386 B2 | 5/2012 | Oh et al. |
| 8,232,865 B2 | 7/2012 | Bates |
| 8,355,313 B2 | 1/2013 | Walton et al. |
| 8,648,721 B2* | 2/2014 | Copeland ............ G08B 13/2431 340/571 |
| 8,712,334 B2* | 4/2014 | Tuttle ................ G06K 7/10346 455/63.3 |
| 9,047,523 B2* | 6/2015 | Tuttle ................ G06K 7/10227 |
| 9,465,964 B2 | 10/2016 | Tuttle |
| 10,242,239 B2 | 3/2019 | Tuttle |
| 10,726,217 B2 | 7/2020 | Tuttle |
| 2003/0045244 A1 | 3/2003 | Lindemann et al. |
| 2003/0179092 A1* | 9/2003 | Loftus .................... G06K 19/04 340/572.7 |
| 2004/0008151 A1 | 1/2004 | Kurihara |
| 2004/0178912 A1* | 9/2004 | Smith .................. H01Q 1/2225 340/572.7 |
| 2005/0052283 A1 | 3/2005 | Collins et al. |
| 2005/0237198 A1* | 10/2005 | Waldner ............. G06K 19/0712 340/572.7 |
| 2006/0080819 A1 | 4/2006 | McAllister |
| 2006/0103535 A1 | 5/2006 | Pahlaven et al. |
| 2006/0145851 A1 | 7/2006 | Posamentier |
| 2006/0202827 A1 | 9/2006 | Volpi et al. |
| 2006/0293027 A1 | 12/2006 | Hammad et al. |
| 2007/0001851 A1* | 1/2007 | Reynolds ........... G06K 19/0723 340/572.1 |
| 2007/0018904 A1 | 1/2007 | Smith |
| 2007/0069862 A1 | 3/2007 | Mo et al. |
| 2007/0096881 A1* | 5/2007 | Pillai .................. G06K 19/0726 340/10.51 |
| 2007/0279286 A1 | 12/2007 | Coutts et al. |
| 2007/0290807 A1 | 12/2007 | Smith et al. |
| 2007/0298838 A1 | 12/2007 | Meiyappan et al. |
| 2008/0024279 A1 | 1/2008 | Gravelle et al. |
| 2008/0076476 A1* | 3/2008 | Rofougaran ......... H01Q 1/2216 455/562.1 |
| 2008/0084310 A1* | 4/2008 | Nikitin ................ G07F 19/208 340/572.7 |
| 2008/0094183 A1 | 4/2008 | Fukushima et al. |
| 2008/0174410 A1* | 7/2008 | Sarangapani ...... G06K 7/10356 340/10.4 |
| 2008/0189142 A1 | 8/2008 | Brown et al. |
| 2008/0227478 A1 | 9/2008 | Greene et al. |
| 2008/0231450 A1* | 9/2008 | Posementier ....... G06K 7/10356 340/572.1 |
| 2008/0233880 A1* | 9/2008 | Rofougaran ......... H03G 3/3078 455/42 |
| 2008/0287067 A1* | 11/2008 | Kawamura ............. B60R 25/24 455/63.1 |
| 2009/0015407 A1 | 1/2009 | Tuttle |
| 2009/0027168 A1* | 1/2009 | Tuttle ...................... H04B 5/00 340/10.2 |
| 2009/0045921 A1 | 2/2009 | Nelson et al. |
| 2009/0058612 A1* | 3/2009 | Chung ................. G06K 7/0008 340/10.2 |
| 2009/0093223 A1* | 4/2009 | McCune, Jr. ........... H04B 1/04 455/126 |
| 2009/0096611 A1* | 4/2009 | Jones ..................... G06K 7/089 340/572.7 |
| 2009/0207092 A1 | 8/2009 | Nysen et al. |
| 2009/0227281 A1 | 9/2009 | Hammad et al. |
| 2009/0267737 A1* | 10/2009 | Kawaguchi ............. H04Q 9/00 340/10.1 |
| 2009/0273449 A1 | 11/2009 | Tuttle |
| 2009/0278688 A1 | 11/2009 | Tuttle |
| 2009/0289771 A1* | 11/2009 | Tuttle ................ G06K 7/10346 340/10.3 |
| 2009/0303005 A1* | 12/2009 | Tuttle ................ G06K 7/10009 340/10.1 |
| 2009/0309797 A1* | 12/2009 | Ozden .................... H01Q 1/48 343/702 |
| 2009/0322634 A1* | 12/2009 | Yun .................... H01Q 1/2225 343/741 |
| 2010/0073138 A1 | 3/2010 | Suzuki et al. |
| 2011/0065402 A1* | 3/2011 | Kraft .................... H04H 60/74 455/230 |

(56) References Cited

U.S. PATENT DOCUMENTS

| | | |
|---|---|---|
| 2011/0254749 A1 | 10/2011 | Amari et al. |
| 2011/0285511 A1 | 11/2011 | Maguire et al. |
| 2012/0026040 A1 | 2/2012 | Hohne et al. |
| 2012/0329407 A1* | 12/2012 | Rousu ................. H01Q 3/2605 455/90.2 |
| 2013/0154802 A1* | 6/2013 | O'Haire ..................... G01S 5/18 340/10.1 |
| 2014/0167922 A1* | 6/2014 | Tuttle ................ G06K 7/10316 340/10.1 |
| 2015/0242664 A1* | 8/2015 | Tuttle ....................... H04Q 9/00 340/10.1 |
| 2016/0371518 A1* | 12/2016 | Tuttle ................ G06K 7/10346 |
| 2019/0205577 A1 | 7/2019 | Tuttle |

OTHER PUBLICATIONS

Peng, Chen et al., "The Analysis and Design of a Novel Passive Reflection Modulation Tag," IEEE Proceedings of the 4th International Conference on Microwave and Millimeter Wave Technology, pp. 402-405, Aug. 2004.

Sakamura, Ken, "TRON News Items for Jan. 2004," located at http://tronweb.super-nova.co.jp/tronnews04-1.html, Jan. 2004.

Turner, Chris, "Backscatter Modulation of Impedance Modulated RFID Tags," located at www.rfip.eu/backscatter_tag_link_budget_and_modulation_at_reader_receiver.pdf, Feb. 2003.

Tuttle, John R., U.S. Appl. No. 08/806,158, filed Feb. 25, 1997, now abandoned.

* cited by examiner

SYSTEMS AND METHODS USING SINGLE ANTENNA FOR MULTIPLE RESONANT FREQUENCY RANGES

RELATED APPLICATIONS

The present application is a continuation application of U.S. patent application Ser. No. 16/297,526, filed Mar. 8, 2019, which is a continuation application of U.S. patent application Ser. No. 15/250,632, filed Aug. 29, 2016, issued as U.S. Pat. No. 10,242,239 on Mar. 26, 2019, which is a continuation application of U.S. patent application Ser. No. 14/710,498, filed May 12, 2015, issued as U.S. Pat. No. 9,465,964 on Oct. 11, 2016, which is a continuation application of U.S. patent application Ser. No. 14/183,240, filed Feb. 18, 2014, issued as U.S. Pat. No. 9,047,523 on Jun. 2, 2015, which is a continuation application of U.S. patent application Ser. No. 12/123,826, filed May 20, 2008, issued as U.S. Pat. No. 8,712,334 on Apr. 29, 2014, and entitled "RFID Device Using Single Antenna for Multiple Resonant Frequency Ranges," the entire disclosures of which applications are hereby incorporated herein by reference.

BACKGROUND

The present invention relates to a radio frequency identification (RFID) device using a single antenna for multiple resonant frequency ranges. RFID is a technology that incorporates the use of electromagnetic or electrostatic coupling in the radio frequency (RF) portion of the electromagnetic spectrum to uniquely identify and communicate with a device attached to an object, animal, or person. With RFID, the electromagnetic or electrostatic coupling in the RF portion of the electromagnetic spectrum is used to transmit signals.

A typical RFID system includes a reader (interrogator) and a plurality of tags. A reader includes an antenna and a transceiver, and transmits a radio frequency signal to a tag to initiate a response from the tag. The tag (RFID device) contains an antenna, circuitry, and information to be transmitted to the reader. The tag antenna enables the circuitry to transmit its information to the interrogator, which converts the radio waves reflected back from the RFID device into digital information that can then be passed on to computers that can analyze the data.

Conventional RFID devices are typically designed for use in a particular frequency range, and according to a single communication protocol. Modifying the RFID devices to operate in additional frequency ranges, and with additional communication protocols, requires significant and costly modifications.

In current EPCglobal® passive device architecture, the amount of time that an RFID device can receive and transmit data per session is limited, due to the minimal amount of charge that the RFID passive device can store. In addition, the communication link between interrogator and RFID device in current RFID systems is limited in range due to constraint distance parameters of powering the RFID device.

SUMMARY OF THE DESCRIPTION

In one aspect, the present disclosure includes a radio frequency device utilizing an antenna having a single antenna structure resonant on multiple resonant frequency ranges. The antenna can be configured to operate within multiple frequency ranges for communication according to respective protocols associated with the respective frequency ranges.

In another aspect, the present disclosure provides a radio frequency identification (RFID) device using a single antenna for multiple resonant frequency ranges.

For example, an embodiment of the invention features an RFID system that includes an RFID interrogator having an interrogator antenna configured to operate within multiple frequency ranges. The system also includes an RFID device having an RFID circuit, and a device antenna coupled to the RFID circuit. The RFID device antenna can be configured to operate within multiple frequency ranges that match at least those of the interrogator antenna(s) for communicating with the RFID interrogator according to respective protocols associated with each respective frequency range.

In another aspect, an embodiment of the invention features an RFID device including an RFID circuit, and an antenna coupled to the RFID circuit. The antenna can be configured to operate within multiple frequency ranges for communicating with at least one RFID interrogator, according to respective protocols associated with each respective frequency range.

In another aspect, an embodiment the invention provides a method that includes 1) receiving radio frequency (RF) signals having different frequency ranges on an antenna coupled to an RFID device and tuned to the different frequency ranges, 2) selecting protocols, such that each protocol is associated with only one of the frequency ranges of the received signals, and 3) processing the received signals according to the protocols associated with the frequency ranges.

BRIEF DESCRIPTION OF THE DRAWINGS

Like reference numbers and designations in the various drawings indicate like elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Certain terms are used throughout the following description and claims to refer to particular system components. As one skilled in the art will appreciate, design and manufacture companies may refer to a component by different names. This disclosure does not intend to distinguish between components that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean an indirect or direct connection. Thus, if a first device couples to a second device, that connection may be through a direct connection or through an indirect connection via other intermediate devices and connections. Moreover, the term "system" is understood to include "one or more components" combined together. Thus, a system can include an "entire system," "subsystems" within a system, a radio frequency identification (RFID) tag, a reader circuit, or any other devices including one or more components.

In general, various embodiments of the present invention configure RFID devices with single antenna structures, for instance, multiband resonant antennas that are designed to operate at multiple carrier frequency ranges. A different communication protocol is utilized with each frequency range, and power can be received by RFID devices over multiple frequency ranges.

Figure 1:
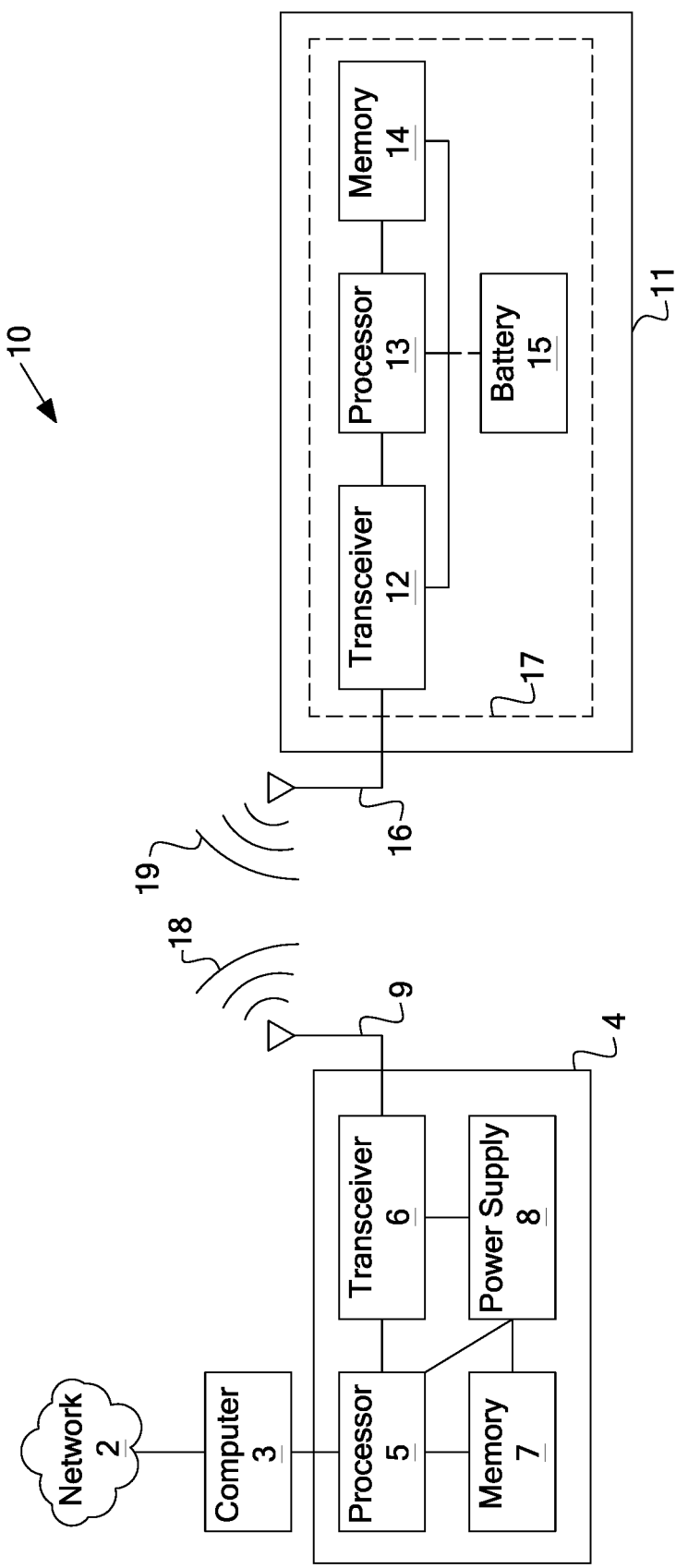
FIG. 1 is a block diagram of an RFID system linked to a network.

FIG. 1 illustrates an exemplary RFID system 10 that includes a computer 3 coupled to a network 2 and to an RFID interrogator 4. The RFID interrogator 4, which may sometimes be referred to as an RFID reader, includes a processor 5, a transceiver 6, a memory 7, a power supply 8, and an antenna 9. The RFID interrogator 4 is programmable and performs transmitting and receiving functions with the transceiver 6 and antenna 9. Alternatively, multiple antennas may be connected to transmitters and receivers. Through antenna 9, the RFID interrogator 4 can communicate with one or more RFID devices 11 that are within communication range of the RFID interrogator 4. Data downloaded from an RFID device 11 can be stored in memory 7, or transferred by the processor 5 to computer 3. Thereafter, this transferred data can be further processed or distributed to network 2.

The exemplary RFID device 11 includes device antenna 16 and RFID circuit 17. The RFID circuit 17 can include a transceiver 12, a processor 13, memory 14, and depending on whether or not RFID device 11 is active, semi-active or passive, a battery 15. Any RF interrogation signal 18 transmitted by the RFID interrogator 4 to the RFID device 11 is received by the antenna 16, and passed to transceiver 12 in RFID circuit 17. When triggered by the transceiver 12, processor 13 fetches the data (e.g., time stamp, unique RFID code, and so forth) from memory 14 and transmits a return signal 19 through antenna 16 to RFID interrogator 4, as multiplexed data packets from transceiver 12.

Figure 2:
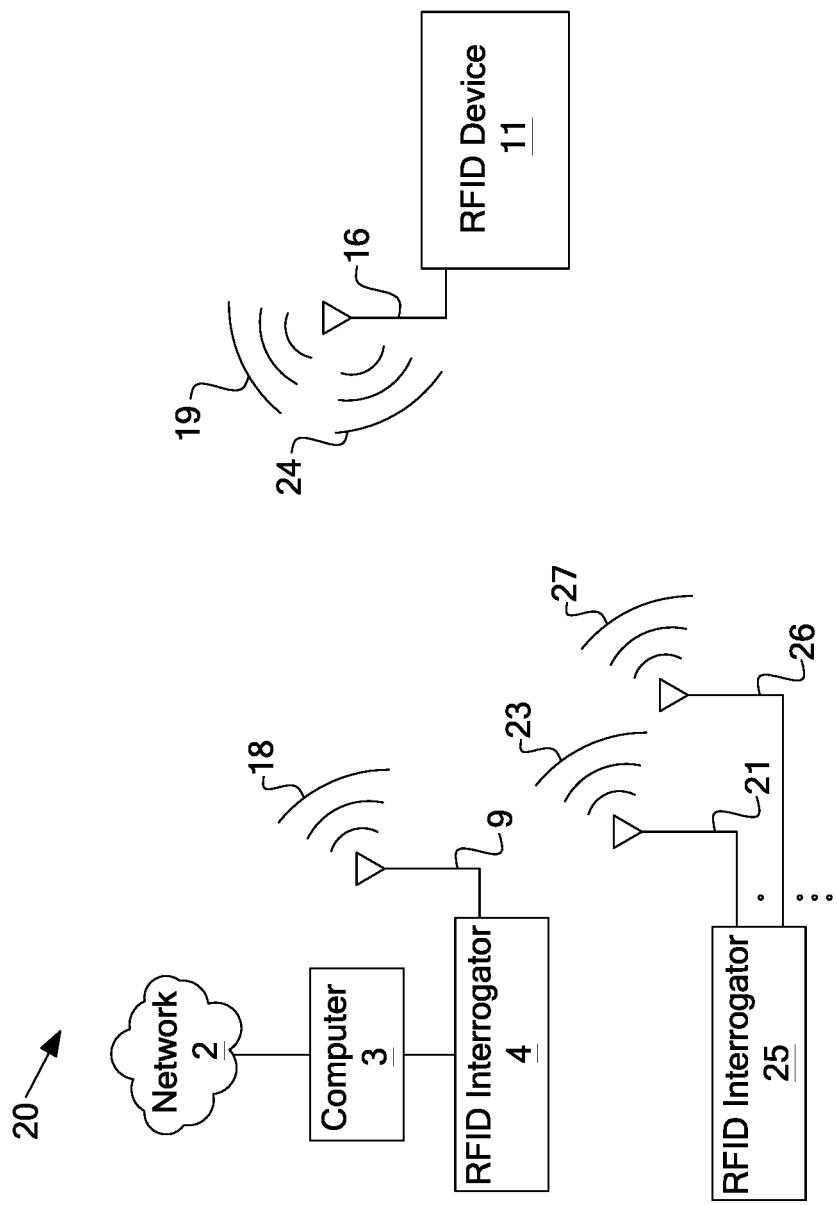
FIG. 2 is a block diagram of an exemplary RFID system.

As shown in FIG. 2, in an exemplary system 20, the RFID interrogator 4 can be configured with antenna 9 that is designed to operate within multiple frequency ranges. Antenna 9 can be a multiband resonant antenna. Another RFID interrogator 25 may be configured with multiple antennas 21, 26 that can be tuned to different respective frequencies or frequency ranges. For example, antenna 21 may operate in a 100 MHz wide frequency range centered at 900 MHz, and antenna 26 may operate in a 100 MHz wide frequency range centered at 2.45 GHz.

The RFID device 11 can be configured with an antenna 16, such as a multiband resonant antenna, that is designed to operate at multiple frequency ranges. Some antenna designs have a primary resonance and secondary resonances, which enable the use of one antenna 16 for multiple carrier frequencies. Another option is to implement antenna 16 as a single antenna structure, such as a patch antenna array, which includes multiple antennas and is resonant on multiple frequency ranges. A single antenna is desirable where space and antenna size are limited. The antenna 16 on device 11 is coupled to the RFID circuit 17, and tuned to frequencies or frequency ranges that match at least those of the corresponding antennas 9, 21, 26 on RFID interrogators 4, 25. For example, antenna 16 on RFID device 11 may operate in a 100 MHz wide frequency range centered at 900 MHz to correspond to antenna 21 on RFID interrogator 25, and antenna 16 on device 11 may also operate in a 100 MHz wide frequency range centered at 2.45 GHz to correspond with antenna 26 on RFID interrogator 25. Such a configuration allows antenna 16 to receive multiple signals 18, 23, 27 from the antennas 9, 21, 26 on RFID interrogators 4, 25, and to respond by transmitting signals 19, 24 on respective frequency ranges that match those of antennas 9, 21, 26.

Figure 3:
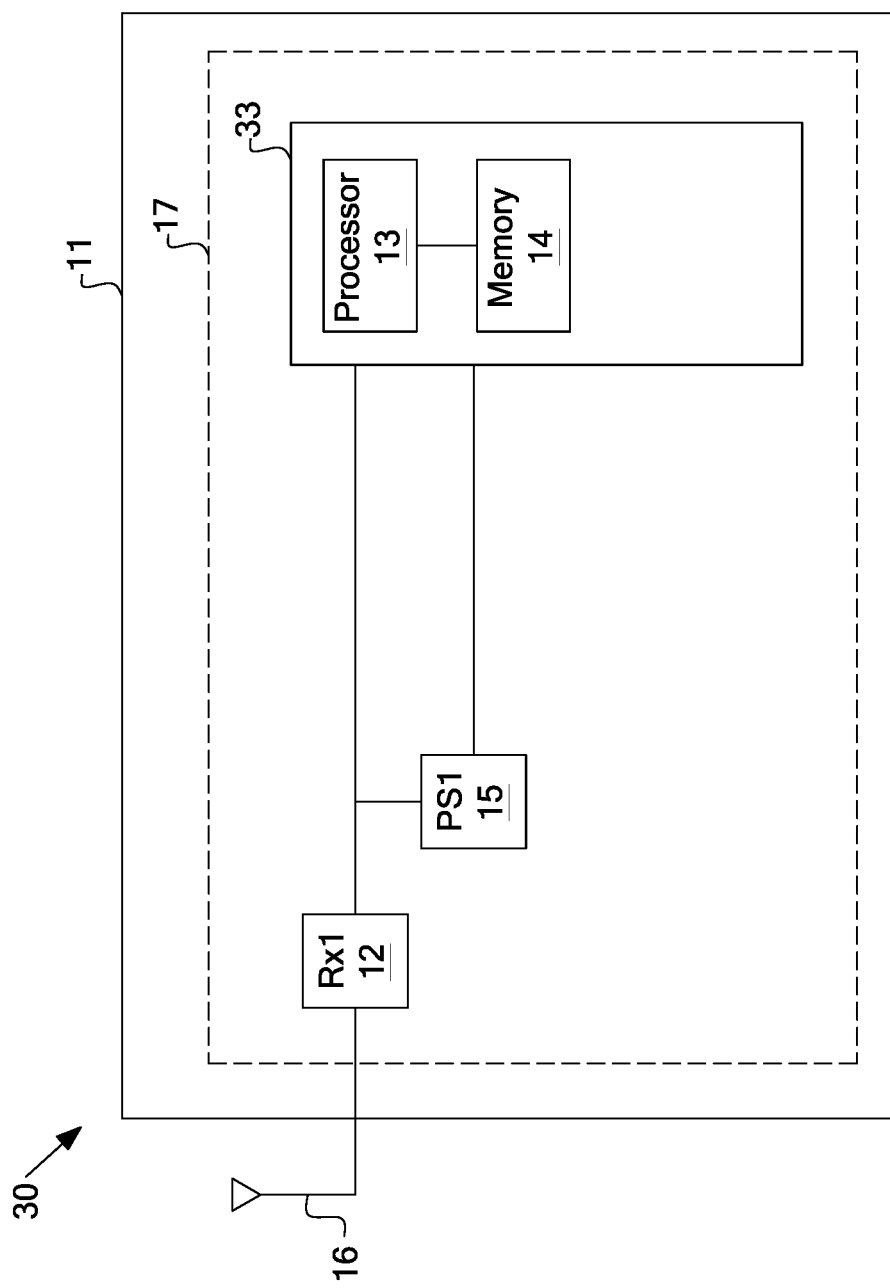
FIG. 3 is a block diagram of an exemplary RFID device.

Referring to FIG. 3, device antenna 16 is connected to the RFID circuit 17, which may include a respective transceiver 12 and a power supply 15. It should be noted that in place of transceiver 12, receivers such as a diode detectors and transmitters can be substituted and coupled to antenna 16. RFID processing circuitry 33 is coupled to the transceiver 12 and power supply 15, and processes a signal according to respective protocols.

Figure 4:
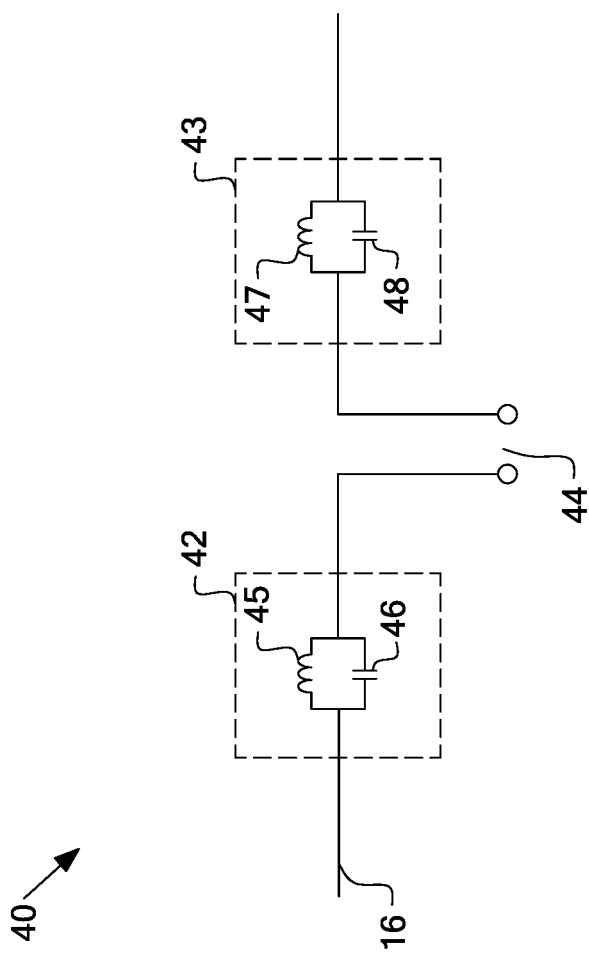
FIG. 4 is a block diagram of an exemplary RFID device antenna.

Referring to FIG. 4, in an embodiment, a multiband (two-band) resonant antenna 40 can be constructed by coupling filter circuits 42, 43 (traps) to antenna 16. Filter circuit 42 includes inductor 45 connected in parallel with capacitor 46. Likewise, filter circuit 43 includes inductor 47 connected in parallel with capacitor 48. The value of inductors 45, 47 and capacitors 46, 48 are selected depending on the expected resonant frequency at which antenna 40 is to operate. The resonant frequency (or trapping frequency) of the filter circuits 42, 43 can be calculated by one divided by the square root of the product of the inductor times the capacitor (1/square root (L*C)). Antenna 16 can be a dipole antenna having a feedpoint 44. The two-band resonant antenna 40 can be constructed with off-the-shelf components, or fabricated using microstrip, stripline, copper etching on PC boards, films, etc.

It should be noted that although dipole antennas are specifically depicted in the figures, other antennas are possible, such as log periodic dipole array, triband Yagi antennas, multiple parallel antennas joined at a common feedpoint (dipoles, patches, etc.), multiple antennas connected serially, and quarter wave dipoles, monopoles and whips.

Figure 5A:
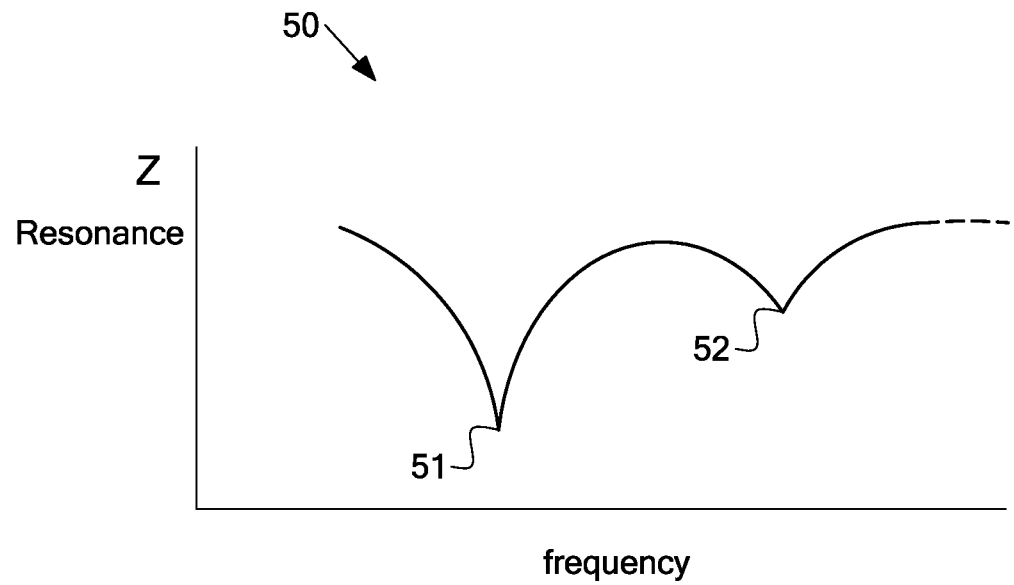
FIG. 5A is a graphical representation of primary and secondary resonant frequencies of an exemplary RFID device antenna.

FIG. 5A shows a graphical representation 50 of two resonances, a primary 51 and secondary 52, which may be used to construct a multiband resonant antenna without the use of filter circuits 42, 43 in each arm of the dipole antenna 16. The secondary resonance 52 is usually not very pronounced, typically resulting in less than optimal performance at the secondary (higher) frequency. However, this antenna design may be useful where space is at a premium.

Figure 5B:
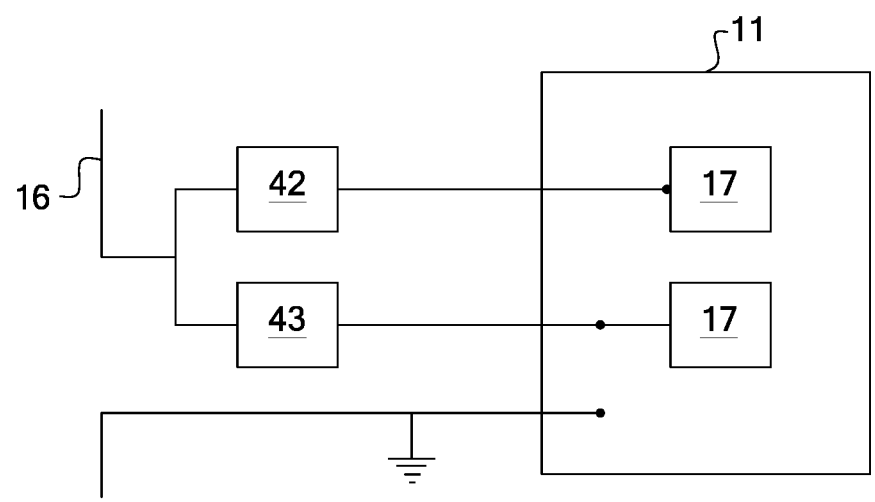
FIG. 5B is a block diagram of an exemplary RFID device.

FIG. 5B shows an embodiment of the antenna graphically represented in FIG. 5A. Specifically, antenna 16 is coupled to two external filter circuits 42, 43. Filter circuit 42 may pertain to resonant frequency 51, and filter circuit 43 may pertain to resonant frequency 52. The filter circuits 42, 43 and antenna 16 are coupled to one or more RFID circuits 17 on RFID device 11. As discussed above, the RFID circuits 17 may include a power supply 15, receivers/transceivers 12, and a processor 13.

Figure 6:
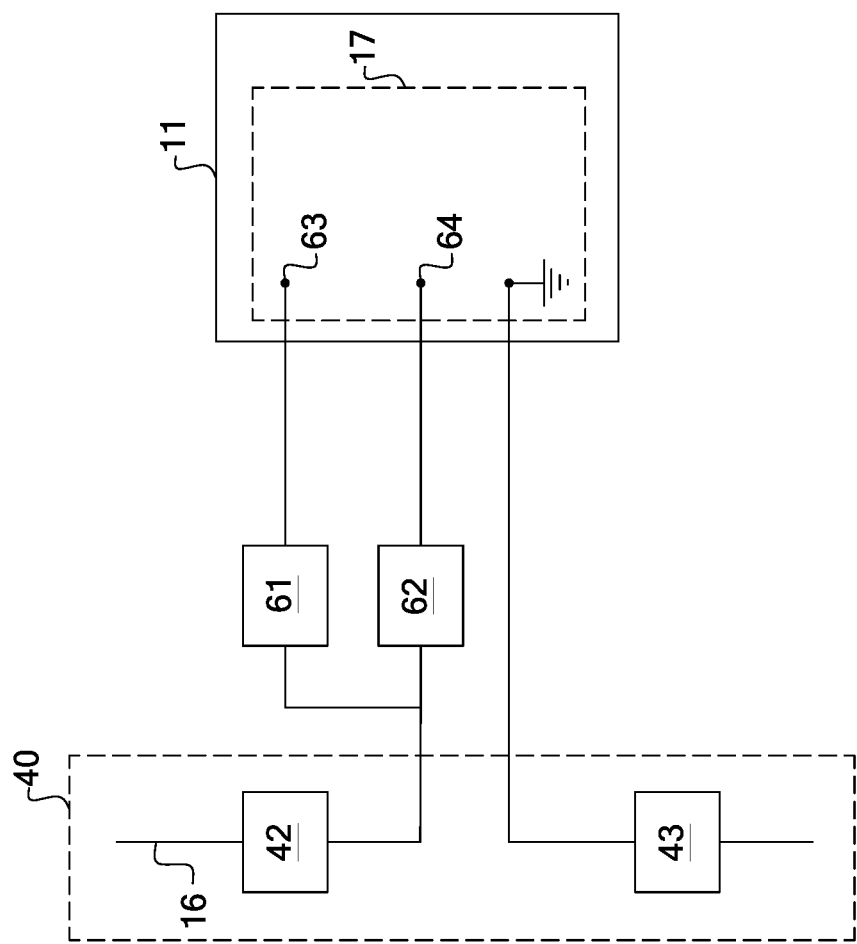
FIG. 6 is a block diagram of an exemplary RFID device.

FIG. 6 shows an exemplary RFID device 11 configured with the two-band antenna structure 40 coupled to two additional respective filter circuits 61 and 62. Power supplies 15, transceivers 12, and additional circuitry 33 may be attached to the filter circuit outputs 63, 64 on RFID circuit 17, and configured to operate simultaneously or one at a time. Matching circuits or components may also be added. Multiple protocols, each carried at a different frequency, can be used simultaneously by connecting the appropriate protocol processing circuitry 33 in RFID circuit 17 to each filter circuit output 63, 64. Two different protocols can be used by connecting the appropriate processor 13, transceiver 12, (and even power supply 15) circuitry to the respective outputs 63, 64 of filter circuits 61, 62.

Figure 7:
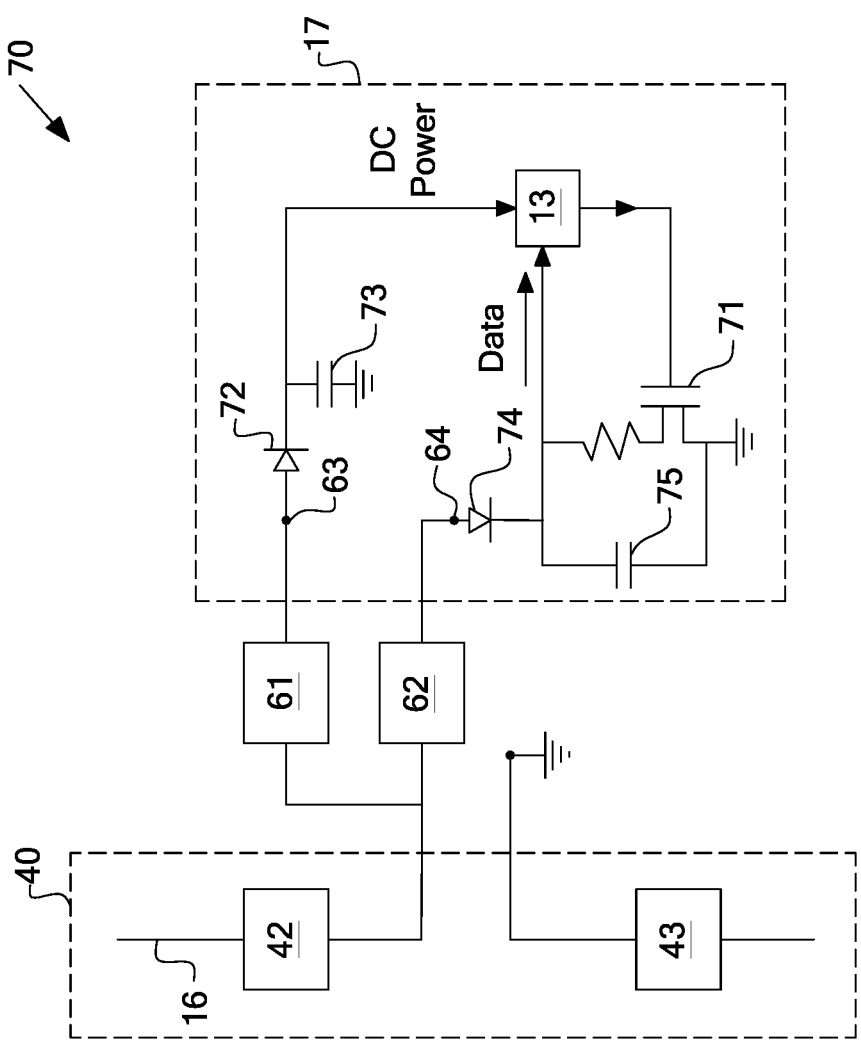
FIG. 7 is a block diagram of an exemplary RFID device.

FIG. 7 shows exemplary RFID device 11 configured as a two frequency system in which one output 63 is used as a power supply, and the other output 64 is used for receiving, transmitting, and processing signals. In particular, RFID device 11 includes the two-band antenna structure 40 that is coupled to the two filter circuits 61 and 62. The output 63 of filter circuit 61 is connected to the RFID circuit 17 and used as a power supply. Specifically, a diode 72 is connected to output 63 and used as a half-wave rectifier to generate direct current (dc) voltage for powering processor 13 and the RFID circuit 17. A filtering capacitor 73 is coupled to the diode 72 to smooth out the dc voltage signal. The output 64 of filter circuit 62 is also connected to RFID circuit 17. Incoming signals from filter circuit 62 are passed through diode 74 and filtering capacitor 75 to the processor 13, which processes the received signals according to a protocol associated with the frequency range of the received signal. RFID circuit 17 can also include an automated voltage control 71 for modulating the frequency on which the processed data is to be transmitted.

System 20 can also be configured to utilize a different communication protocol (e.g., EPCglobal® protocol, EPC HF Class 1, EPC UHF Class 0, EPC UHF Class 1, EPC UHF Class 1 Gen 2) on each respective frequency range. Such a configuration permits the RFID interrogators 4, 25 to communicate with RFID device 11 simultaneously or serially over each respective frequency range. Using a different protocol on each frequency range also enables multiple RFID interrogators to communicate simultaneously or serially at the different frequency ranges with the same RFID device 11. More specifically, using multiple protocols enables a single RFID device 11 to perform different functions. For example, an EPC UHF Class 1 protocol may be used by RFID device 11 for identification of a hospital patient, and the same RFID device 11 using an entirely different protocol (e.g., EPC HF Class 1) on a different frequency range can be used for communicating with hospital equipment, monitoring patient data, or communicating with a nurse station to report patient status at a greater distance.

As a further example, tuning or selecting antenna 9 on RFID interrogator 4 and antenna 16 on the RFID device 11 to operate within a frequency range centered at 900 MHz, establishes a first communication link between the RFID interrogator 4 and RFID device 11. Similarly, tuning antenna 9 on RFID interrogator 4 and antenna 16 on the RFID device 11 to also operate within a frequency range centered at 2.45 GHz, establishes a second communication link between the RFID interrogator 4 and the RFID device 11. The 900 MHz frequency range can be used as a carrier for communications according to a first protocol, and the 2.45 GHz frequency range can be used as a carrier for communications according to a second protocol. The RFID interrogator 4 and device 11 can communicate simultaneously or serially over the two frequency ranges.

In another embodiment, the first frequency range may be used to provide power from the RFID interrogator 4 to the RFID device 11, and the second frequency range may be used for communication according to a particular protocol. Powering the passive device 11 on the first frequency range, while simultaneously communicating over the second frequency range, has the advantage of enabling the device 11 to stay energized longer, to receive or transmit more data per session and to extend processing time. The device 11 can also be configured to receive power from the RFID interrogators 4, 25 at multiple frequency ranges.

The powering of the RFID device 11, as opposed to commands or data sent to and from the RFID device 11, is typically a range-limiting factor in the communications link between RFID interrogators 4, 25 and RFID device 11. This is primarily due to free-space path loss, which tends to increase with frequency. Free-space path loss is the loss in signal strength of an electromagnetic wave that results from a line-of-sight path through free space, with no obstacles nearby to cause reflection or diffraction. Free-space power loss is proportional to the square of the distance between the transmitter and receiver, and also proportional to the square of the frequency of the radio signal. Therefore, when selecting a frequency range to power the device 11, it can be advantageous to utilize the lowest available frequency range to minimize the effects of free-space path loss and to extend the range of the device 11. Data can be sent at a higher frequency, which tends to balance the communication link.

In designing and implementing the antennas and system 20, frequency ranges are selected that are non-harmonic, non-integer multiple or non-integer-fraction frequencies relative to the other selected frequency ranges. For example, if a first frequency range is centered at 900 MHz, a subsequent frequency range should not be selected at 1800 MHz (the first harmonic of the first range). An advantage is if multipath interference exists at the first frequency range, such interference would be very unlikely at the second frequency range. Using this configuration, reliability and range can be improved by using redundant power transmissions at multiple frequency ranges, either simultaneously or multiplexed one at a time.

In embodiments, the RFID device 11 with antenna can be implemented as part of rigid (e.g., substrate-based) or flexible (e.g., RFID label) configuration. Depending on the application, printed or etched layout techniques including stripline, microstrip, organic or polymer semiconductors can be utilized for fabricating planar components or components on substrates that may be rigid or flexible.

Figure 8:
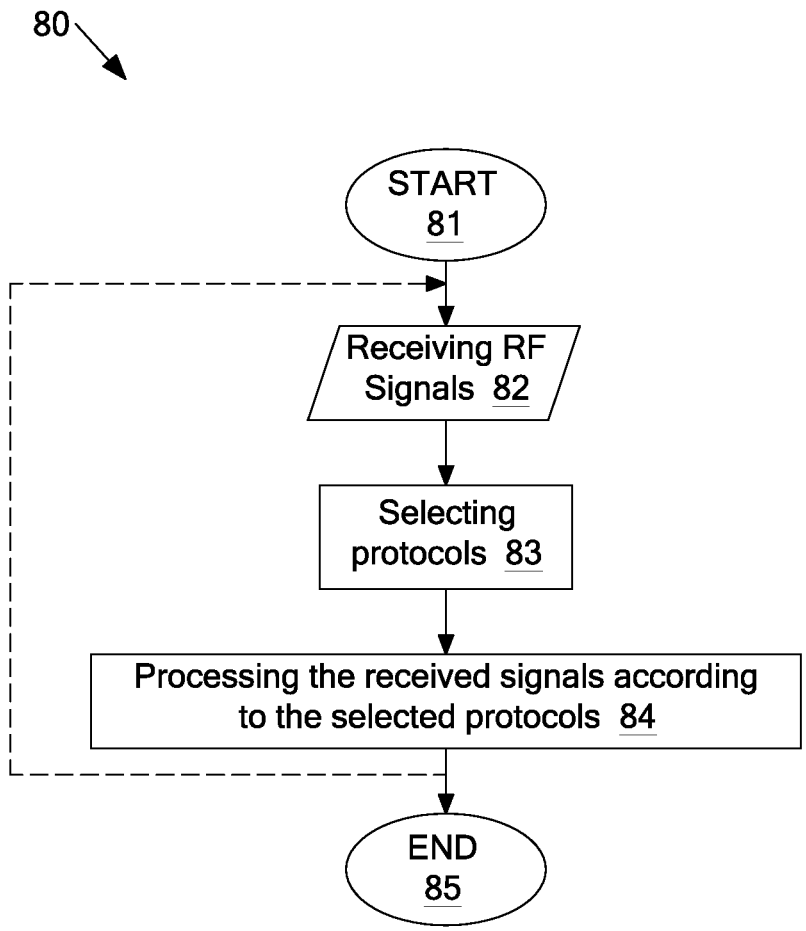
FIG. 8 is a flow diagram.

FIG. 8 illustrates a method of operation 80 of an RFID device that is in accordance with an embodiment of the present invention. The method (80) starts (81) by receiving radio frequency (RF) signals (82) having different frequency ranges on an antenna tuned to the different frequency ranges. Once the signals are received, protocols are selected (83) so that each protocol is associated with only one of the frequency ranges of the received signals. The method (80) then processes (84) the received signals according to the protocols associated with the frequency ranges. Method (80) can then either end (85), or if implemented in an automated system e.g., firmware, the method (80) can proceed to step (82) and continue to repeat.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA).

Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a device having:
      a memory configured to store at least one identification number of the device;
      an antenna system having a first resonant frequency for a first frequency band and a second resonant frequency for a second frequency band, wherein the first frequency band and the second frequency band are separate from each other;
      a transceiver coupled to the antenna system and configured to receive signals transmitted in the first frequency and signals transmitted in the second frequency; and
      a processor coupled with the memory and the transceiver and configured to provide the identification number of the device; and
   a first communication apparatus configured to communicate with the device using the first frequency; and
   a second communication apparatus, separate from the first communication apparatus, configured to communicate with the device using the second frequency;
   wherein the first communication apparatus and the second communication apparatus are positioned in different distance ranges from the device;
   wherein the first communication apparatus is configured to communicate with the device using a first communication protocol; and the second communication apparatus is configured to communicate with the device using a second communication protocol different from the first communication protocol.

2. The system of claim 1, wherein the device is configured to perform a first function in communications with the first communication apparatus and perform a second function, different from the first function, in communications with the second communication apparatus.

3. The system of claim 2, wherein the first communication apparatus is configured to identify a hospital patient; and the second communication apparatus is configured to monitor patient data or reports patient status.

4. The system of claim 1, wherein the first communication apparatus and the second communication apparatus communicate with the device concurrently using the first communication protocol and the second communication protocol respectively.

5. The system of claim 4, wherein the first communication protocol is in accordance with an EPC UHF protocol; and the second communication protocol is in accordance with an EPC HF protocol.

6. The system of claim 1, wherein the antenna system includes a patch antenna array.

7. The system of claim 1, wherein the antenna system includes an antenna and a plurality of trap filters coupled with the antenna.

8. A device, comprising:
a memory storing at least one identification number of the device;
an antenna system having a first resonant frequency for a first frequency band and a second resonant frequency for a second frequency band, wherein the first frequency band and the second frequency band are separate from each other;
a transceiver coupled to the antenna system and configured to receive signals transmitted in the first frequency and signals transmitted in the second frequency; and
a processor coupled with the memory and the transceiver and configured to provide the identification number of the device;
wherein the device is configured to provide a first function in response to communication with at the first frequency from a first communication apparatus;
wherein the device is configured to provide a second function, different from the first function, in response to communication with at the second frequency from a second communication apparatus;
wherein the first communication apparatus and the second communication apparatus are positioned in different distance ranges from the device;
wherein the communication at the first frequency is in accordance with a first communication protocol, and the communication at the second frequency is in accordance with a second communication protocol that is different from the first communication protocol.

9. The device of claim 8, wherein the device is configured to perform the first function and the second function concurrently in response to the communication at the first frequency and the communication at the second frequency.

10. The device of claim 9, wherein the first communication protocol is in accordance with an EPC UHF protocol; and the second communication protocol is in accordance with an EPC HF protocol.

11. The device of claim 8, wherein the first function identifies a person; and the second function identifies data or status of the person.

12. The device of claim 8, wherein the antenna system includes a patch antenna array.

13. The device of claim 8, wherein the antenna system includes an antenna and two trap filters coupled with the antenna, and the two trap filters have the first resonant frequency and the second resonant frequency respectively.

14. The device of claim 13, wherein the antenna is one of: a dipole antenna, a log periodic dipole array antenna, a triband yagi antenna, a quarter wave dipole antenna, a monopole antenna, and a whip antenna.

15. A method, comprising:
communicating with a device using a first frequency, wherein the device has:
a memory configured to store identification number of the device;
an antenna system resonant with the first frequency for a first frequency band and a second frequency for a second frequency band, wherein the first frequency band and the second frequency band are separate from each other;
a transceiver coupled to the antenna system and configured to receive signals transmitted in the first frequency and signals transmitted in the second frequency; and
a processor coupled with the memory and the transceiver and configured to provide the identification number of the device; and
communicating with the device using a second frequency, concurrently with the communicating with of the device using the first frequency;
wherein the interrogating the device using the first frequency is in accordance with a first communication protocol; and the interrogating the device using the second frequency is in accordance with a second communication protocol that is different from the first communication protocol.

16. The method of claim 15, further comprising:
providing a first function via the device being communicating with at the first frequency; and
providing a second function, different from the first function, via the device being communicating with at the second frequency.

* * * * *